(No Model.)
G. D. STRAYER.
BORING BRACE.
No. 512,237. Patented Jan. 2, 1894.
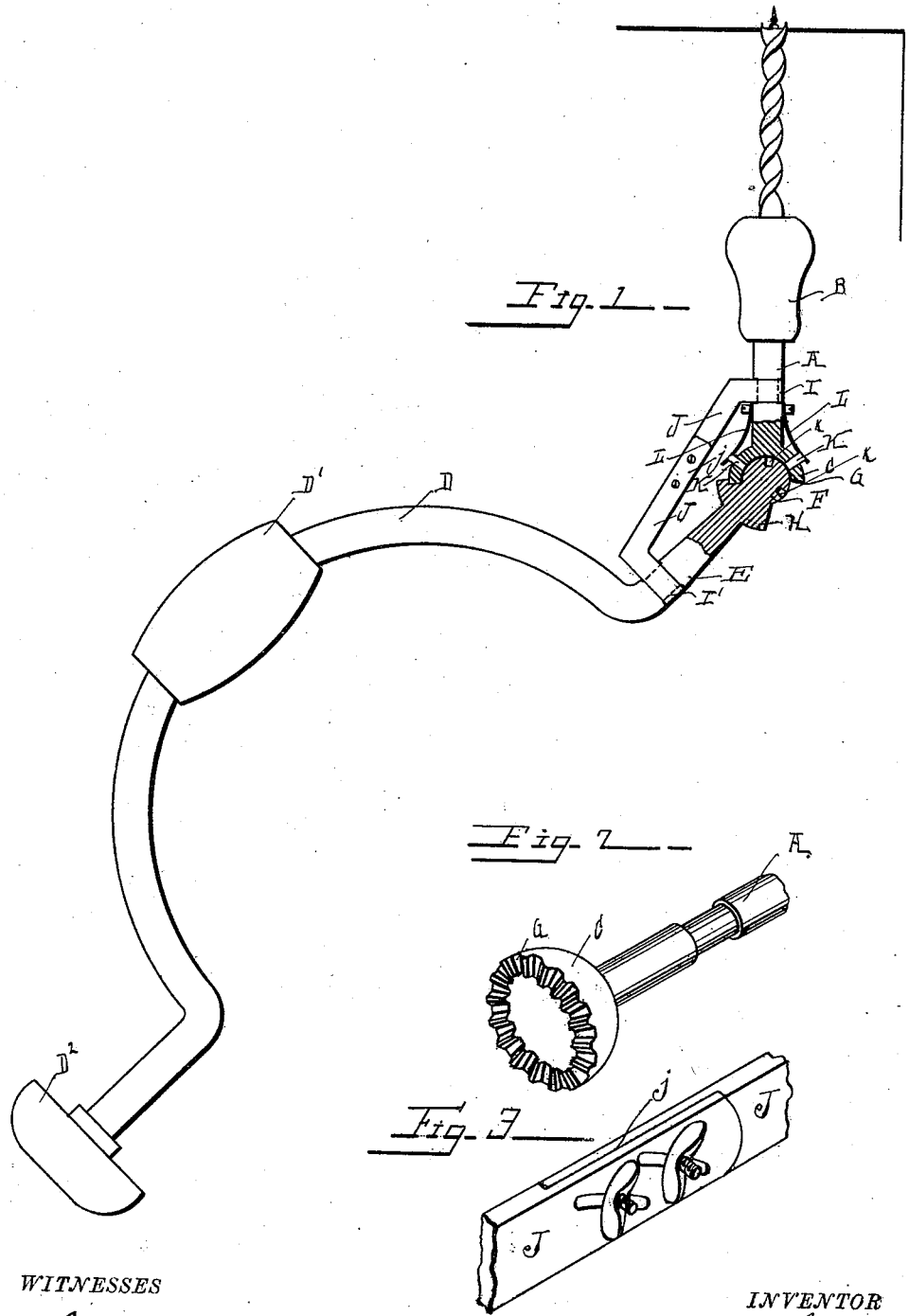
WITNESSES
Geo. M. Anderson
Phil Masi
INVENTOR
Geo. D. Strayer
by E. W. Anderson
his Attorney

UNITED STATES PATENT OFFICE.

GEORGE D. STRAYER, OF EAST STROUDSBURG, PENNSYLVANIA.

BORING-BRACE.

SPECIFICATION forming part of Letters Patent No. 512,237, dated January 2, 1894.

Application filed June 6, 1893. Serial No. 476,729. (No model.)

*To all whom it may concern:*

Be it known that I, GEORGE D. STRAYER, a citizen of the United States, and a resident of East Stroudsburg, in the county of Monroe and State of Pennsylvania, have invented certain new and useful Improvements in Boring-Braces; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a plan view of the invention partly in section and Fig. 2 is a perspective view in detail of the bit stock. Fig. 3 is a detail view of the braces J, J.

This invention has relation to certain new and useful improvements in boring braces, the object being to provide a brace, especially designed for use for boring in angles, or close to uprights of any kind, and designed to take the place of ratchet braces, being an improvement over such braces, in that it does not require to be worked forward to cut and then backward to get ready for the next cut, but works continuously in a forward and cutting direction.

A further object is to provide a brace of this character of simple construction, possessing strength and durability, and which may, when desired, be used in the manner of an ordinary brace.

With these objects in view, the invention consists in the novel construction and combination of parts, all as hereinafter described, and pointed out in the claims.

Referring to the accompanying drawings, the letter A designates the bit stock or stem, having a screw collar shank clutch or clamp B, of any approved form, said stock or stem terminating at its upper end portion in a semispherical socket C.

D designates the usual curved stem having the loose handle D', and breast pin D², and terminating at its lower end in a straight shank portion E, on the lower end of which is a ball or sphere F, which works in the socket C. On the upper edge of said socket C is an annular spur gear ring G, and on the shank E is a spur gear wheel H, the teeth of which mesh with the teeth on said ring, the shank E being inclined to the stem or stock A.

I, I' are collars around the stem A and shank E respectively, said collars being connected by means of braces J, J, which may be shortened or lengthened by means of the sliding lap joint at *j*.

When desired, the brace may be used straight, in the same manner as an ordinary brace, by loosening the braces J, J, at the joint *j* when the parts may be straightened up, and held by means of pins K, K. Said pins K, K, are carried by springs L L which cause them to engage seats *k k* in the ball F, through holes in the socket C.

Having thus described my invention, what I claim, and desire to secure by Letters Patent, is—

1. The herein described boring brace, comprising the bit stem or stock having the socket bearing portion at its upper end, the annular gear ring on said socket portion, and the stem having the ball or sphere engaging said socket bearing, a gear wheel meshing with said gear ring, and a brace connecting said stock and stem, substantially as specified.

2. The herein described boring brace, comprising a bit stem or stock, the socket portion at the upper end thereof, and the annular gear ring on said socket portion, in combination with the usual curved stem having the shank E, the ball or sphere in said shank and engaging said socket, the gear wheel thereon adapted to engage with said gear ring, the collars on said stock or stem, and the jointed brace connecting said collars, substantially as specified.

3. In a boring brace, the combination with the bit stock or stem, its socket portion, and the annular gear ring thereon, of the shank E, its ball F engaging said socket, its gear wheel adapted to mesh with said gear ring, the jointed brace, and the spring actuated pins adapted to engage seats in said ball, substantially as specified.

In testimony whereof I affix my signature in presence of two witnesses.

GEORGE D. STRAYER.

Witnesses:
 W. H. VOSS,
 F. H. KISHPAUGH.